US012722946B2

(12) United States Patent
Lin

(10) Patent No.: US 12,722,946 B2

(45) Date of Patent: Sep. 1, 2026

(54) HEIGHT QUICKLY-ADJUSTABLE JACK

(71) Applicant: ZHEJIANG HONGLI (A/LIST) TOOLS CO., LTD., Jinhua (CN)

(72) Inventor: Cangze Lin, Jinhua (CN)

(73) Assignee: ZHEJIANG HONGLI (A/LIST) TOOLS CO., LTD., Jinhua (CN)

( * ) Notice: Subject to any disclaimer, the term of this patent is extended or adjusted under 35 U.S.C. 154(b) by 251 days.

(21) Appl. No.: 18/791,642

(22) Filed: Aug. 1, 2024

(65) Prior Publication Data

US 2025/0368479 A1 Dec. 4, 2025

(30) Foreign Application Priority Data

May 28, 2024 (CN) ........................ 202410670929.9

(51) Int. Cl.
*B66F 3/10* (2006.01)

(52) U.S. Cl.
CPC ..................................... *B66F 3/10* (2013.01)

(58) Field of Classification Search
CPC ...... B66F 3/08; B66F 3/10; B66F 3/24; B66F 3/28; B66F 3/36; B66F 5/00; B66F 7/08
See application file for complete search history.

(56) References Cited

U.S. PATENT DOCUMENTS

| | | | | |
|---|---|---|---|---|
| 5,427,355 A * | 6/1995 | Sukonthapanich | ....... | B66F 3/36 254/100 |
| 12,240,421 B1 * | 3/2025 | Peacemaker | .............. | B60S 9/08 |
| 2003/0001144 A1 * | 1/2003 | Kubota | ..................... | B66F 3/10 254/103 |
| 2011/0089310 A1 * | 4/2011 | Heintz | ...................... | B60R 3/02 248/677 |
| 2012/0112147 A1 * | 5/2012 | Hernandez, Jr. | .......... | B66F 3/30 254/93 H |
| 2012/0153245 A1 * | 6/2012 | Zloch | ........................ | B66F 3/36 254/133 R |
| 2025/0340412 A1 * | 11/2025 | Lin | .......................... | B66F 3/10 |

* cited by examiner

*Primary Examiner* — Lee D Wilson

(74) *Attorney, Agent, or Firm* — HOWARD M COHN and Associates, LLC

(57) ABSTRACT

The present disclosure discloses a height quickly-adjustable jack, including a telescopic component and a load-bearing component. The telescopic component is provided with a limiting plate, an outer pipe and an inner pipe. The inner pipe is located inside the outer pipe, and the inner pipe is movably connected with the outer pipe along a center line of the outer pipe. The outer pipe has a hexagonal pipe structure. The limiting plate is fixedly mounted outside the outer pipe and is only connected with one of side surfaces. An extension direction of the limiting plate on the outer pipe is parallel to the center line of the outer pipe. The limiting plate is provided with limiting holes. The load-bearing component is movably mounted on the outer pipe.

10 Claims, 11 Drawing Sheets

HEIGHT QUICKLY-ADJUSTABLE JACK

TECHNICAL FIELD

The present disclosure relates to a height quickly-adjustable jack.

BACKGROUND

A jack for a travel trailer can provide a stable, long-lasting and reliable support force for a vehicle body in a parking state, and is an important accessory for the travel trailer. The jack includes three components, namely a telescopic component, a load-bearing component and a support component. The telescopic component is provided with a hand crank, a lead screw mechanism, an outer pipe and an inner pipe, the inner pipe is located inside the outer pipe, the inner pipe is connected with the outer pipe through the lead screw mechanism, and the hand crank is connected with a lead screw of the lead screw mechanism. After the hand crank is driven to rotate, the lead screw mechanism will drive the inner pipe to move inside the outer pipe. Therefore, the telescopic component has a telescopic function. The load-bearing component is welded to the outer pipe, and is directly connected with the vehicle body and responsible for dragging the vehicle body. During operating, the support component directly touches the ground and is fixedly connected with the inner pipe. The hand crank can be driven to increase or reduce the operating height of the entire jack. However, when the hand crank is rotated, the operating height of the jack changes a little, and it is usually necessary to rotate the hand crank many turns to obtain an obvious change in operating height.

The use of the jack requires a large number of rotations of the hand crank to obtain an obvious change in operating height, resulting in use defects in use scenarios where the operating height of the jack is greatly adjusted. For example, when the jack requires a relatively low operating height in the previous parking place and the ground height changes after the parking place is changed, it is necessary to greatly increase the operating height of the jack, the required operating height can be obtained only by rotating the hand crank many turns, and thus, the adjusting speed is very slow. When the operating height is greatly adjusted, the use defects of time waste and labor waste of this operating height adjusting manner are more obvious.

SUMMARY

The technical problem to be solved by the present disclosure is how to increase the speed of adjusting the operating height, thereby obtaining a height quickly-adjustable jack.

In order to solve the above technical problem, the present disclosure adopts the following technical solution. The height quickly-adjustable jack includes a telescopic component and a load-bearing component; the telescopic component is provided with an outer pipe and an inner pipe; the inner pipe is located inside the outer pipe, and the inner pipe is movably connected with the outer pipe along a center line of the outer pipe; the outer pipe has a hexagonal pipe structure; an outer surface of the outer pipe is provided with six side surfaces; the telescopic component is also provided with a limiting plate; the limiting plate is fixedly mounted outside the outer pipe and is only connected with one of the side surfaces; an extension direction of the limiting plate on the outer pipe is parallel to the center line of the outer pipe; the limiting plate is provided with limiting holes; an arrangement direction of the limiting holes is parallel to the center line of the outer pipe; the load-bearing component is movably mounted on the outer pipe; the load-bearing component is provided with a pipe sleeve, a load-bearing seat and a clamping component; a through-type accommodating hole is formed inside the pipe sleeve; the accommodating hole includes a hole I for accommodating the outer pipe and a hole II for accommodating the limiting plate; the hole I is in communication with the hole II; a center line of the hole I coincides with the center line of the outer pipe; an outer contour shape of the cross section of the outer pipe and a contour shape of the cross section of the hole I are both regular hexagons; an outer contour shape of the cross section of the limiting plate and a contour shape of the cross section of the hole II are both rectangles; a contour shape of the cross section of the accommodating hole is the same as a contour shape of the cross section of the outer pipe at a position provided with the limiting plate; the clamping component includes a limiting column, a spring and a handle; the cross section of the limiting column is convex; the spring is sleeved over the limiting column; the pipe sleeve is provided with a mounting hole; the cross section of the mounting hole is convex; the limiting column is mounted in the mounting hole in a sliding manner; the spring is located between the limiting column and the pipe sleeve; one end of the limiting column is located outside the pipe sleeve and is fixedly connected with the handle, and the other end of the limiting column extends into the hole II; the load-bearing seat is fixedly mounted on the pipe sleeve; and the pipe sleeve is embedded in the accommodating hole through the outer pipe and the limiting plate, and the limiting column is embedded in the limiting hole and movably mounted on the telescopic component.

The load-bearing component in the above height quickly-adjustable jack is mounted on the telescopic component in a flexible and detachable manner. The limiting plate is provided with a plurality of limiting holes. During operating, the outer pipe presents a spatial posture that extends in a vertical direction. When the limiting column of the load-bearing component is embedded in different limiting holes, the load-bearing component can be located at different operating heights. In this way, during the operating process of greatly adjusting the height, the load-bearing component can be placed at a position close to a predetermined operating height first, and then, the height is finally adjusted through a hand crank, thereby forming an operating height adjusting process that combines coarse adjustment and fine adjustment. During coarse adjustment, the position of the operating height of the load-bearing component changes a lot, and less time is required. During fine adjustment, the length of the telescopic component, namely the overall operating height of the jack, changes a little, and less time is required. Finally, the effect of quickly adjusting the operating height is obtained, the time is saved, and the labor is also saved.

The combined structure of the load-bearing component and the telescopic component in the height quickly-adjustable jack also facilitates the packaging and storing processes of the jack. Before entering the usage stage, the load-bearing component can be detached from the telescopic component, and at least the load-bearing component and the telescopic component can be independently packaged and stored. The sum of the packaging spaces occupied by the load-bearing component and the telescopic component respectively is less than the packaging space occupied by the assembled jack. This is because the components of the jack are unfolded in all directions, the jack does not have a compact structure, and the packaging space is often a rectangular structure so that the jack as a whole requires a relatively large packaging space. However, the components of the jack have a very compact structure respectively and do not have a structure that extends excessively in all directions, so that the packaging space required by each component of the jack is relatively small. As a result, the sum of the packaging spaces occupied by the components is less than the packaging space required by the jack as a whole.

When the load-bearing component or the telescopic component is damaged, the load-bearing component or the telescopic component can be removed separately and only needs to be replaced with a normal component to obtain a usable jack again. This manner also facilitates the disassembly of components for maintenance.

In this technical solution, the load-bearing component and the telescopic component are combined in a movable manner, and the strength of combination between the load-bearing component and the telescopic component will inevitably affect the overall structural strength. This technical solution ensures the overall structural strength of the jack by strengthening the structural strength of the telescopic component. The outer pipe having the hexagonal pipe structure is adopted, and the side structure of the surface of the outer pipe well constructs a uniformly-stressed surface structure which is less prone to local stress. The combination of the limiting plate and the outer pipe increases the structural strength of the outer pipe.

In the structure where the outer pipe having the hexagonal pipe structure is combined with the limiting plate, even if the load-bearing component applies an acting force to the outer pipe in a circumferential direction around the center line of the outer pipe, the outer pipe is not easily bent or deformed, that is, after the outer pipe is combined with the limiting plate, the structural strength of the outer pipe is sufficient to ensure relatively high resistance to torsion. As a result, the telescopic component not only has lateral structural strength, but also has structural strength in the circumferential direction around the center line of the outer pipe.

There are two preferred solutions for the hexagonal pipe structure of the outer pipe. One preferred solution is that the inside and outside of the outer pipe are both of hexagonal pipe structures, the inner contour shape of the cross section of the outer pipe is a regular hexagon, and the outer contour shape and the inner contour shape of the cross section of the inner pipe are both regular hexagons. Another preferred solution is that the inside of the outer pipe is a circle, the outside of the outer pipe is of a hexagonal pipe structure, the inner contour shape of the cross section of the outer pipe is a circle, and the outer contour shape and the inner contour shape of the cross section of the inner pipe are both circles.

In order to ensure that the limiting plate has sufficient structural strength and also has the characteristic of light weight, edges of the limiting plate are provided with arc-shaped gaps, and the gaps and the limiting holes are arranged in a staggered manner in a direction parallel to the center line of the outer pipe. The distribution characteristic of the gaps relative to the limiting holes can greatly ensure the structural strength of the limiting plate, and can also obtain the advantage of extremely light weight.

In order to improve the smoothness of the sliding action of the limiting column in the mounting hole, the pipe sleeve is provided with a guide column, the mounting hole is located in the guide column, a center line of the mounting hole coincides with a center line of the guide column, the handle is provided with a guide sleeve, the guide column extends into the guide sleeve, and the guide sleeve is slidably connected with the guide column. In this way, the situation that only the guide column bears the own weight and the weight of the handle can be avoided, and the friction force between the limiting column and the pipe sleeve can be reduced.

In order to prevent granular dirt from entering between the guide sleeve and the guide column, the pipe sleeve is provided with a baffle ring, and the guide sleeve is located inside the baffle ring.

One preferred solution of the load-bearing seat is that the top of the load-bearing seat is provided with a wavy object-bearing surface corresponding to a load-bearing operation. Another preferred solution of the load-bearing seat is that the load-bearing seat is provided with a turntable, and the rotation direction of the turntable is located in a vertical plane. Still another preferred solution of the load-bearing seat is that the load-bearing seat is provided with an assembly hole, and a center line of the assembly hole is perpendicular to the center line of the outer pipe. Yet another preferred solution of the load-bearing seat is that the contour of the load-bearing seat is a triangle, and a center line of the load-bearing seat coincides with the center line of the hole I.

The present disclosure adopts the above technical solution: The height quickly-adjustable jack has a flexible and detachable structure, and an operating height adjusting process that combines coarse adjustment and fine adjustment is formed. During coarse adjustment, the position of the operating height of the load-bearing component changes a lot, and less time is required. During fine adjustment, the length of the telescopic component, namely the overall operating height of the jack, changes a little, and less time is required. Finally, the effect of quickly adjusting the operating height is obtained, the time is saved, and the labor is also saved.

BRIEF DESCRIPTION OF FIGURES

The present disclosure will be further specifically described below with reference to the accompanying drawings and specific implementations.

DETAILED DESCRIPTION

Figure 1:
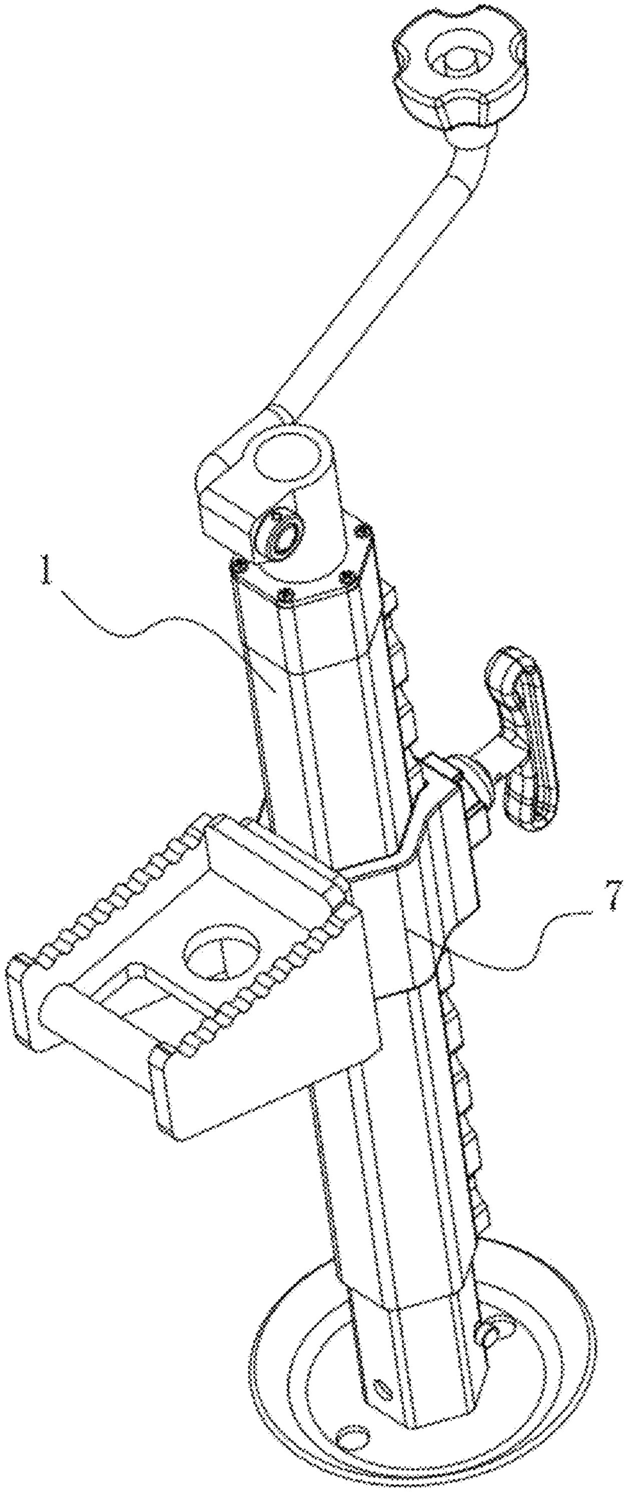
FIG. 1 is a schematic structural view of a first embodiment of the present disclosure.
Figure 2:
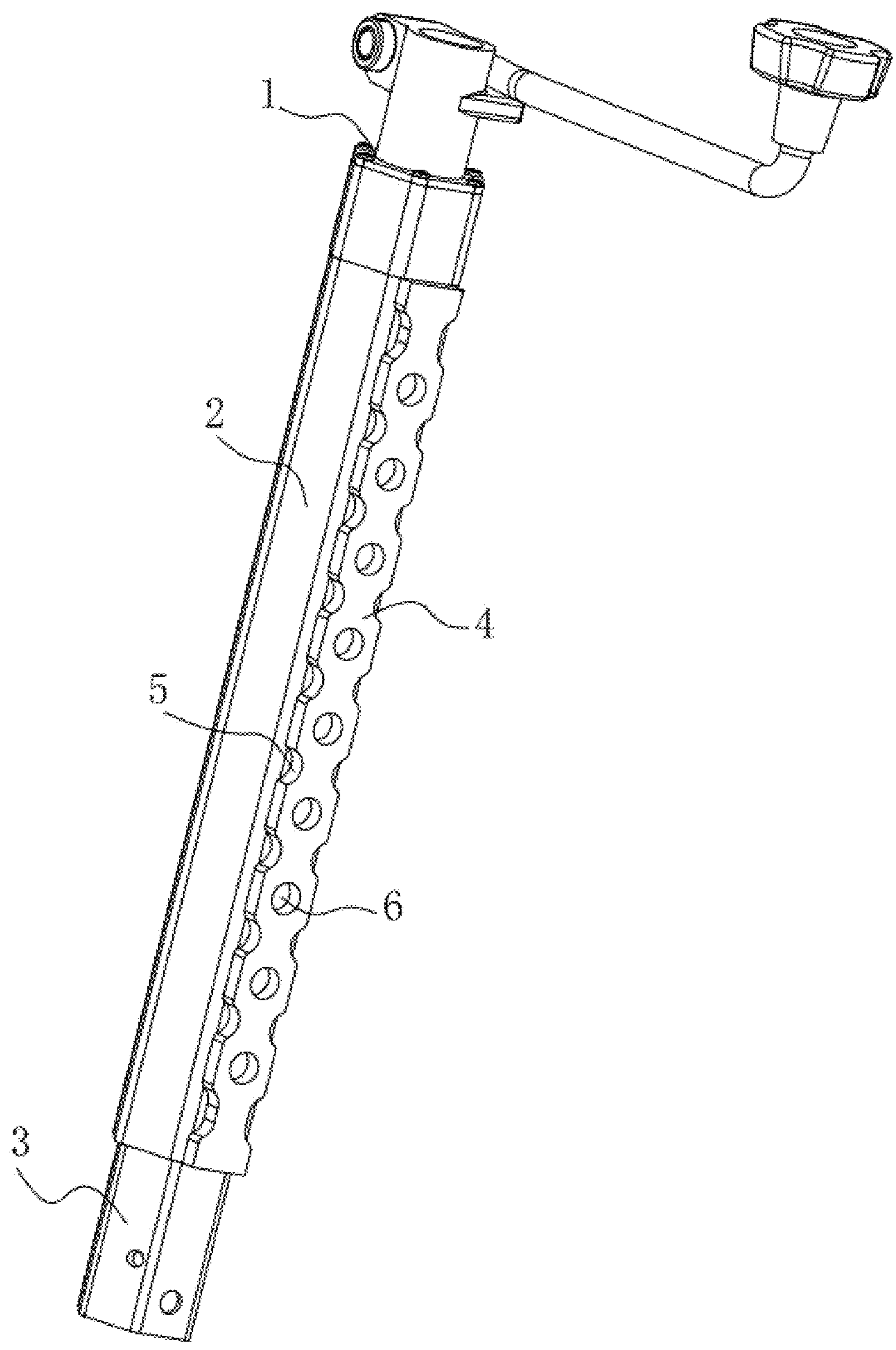
FIG. 2 is a schematic structural view of a telescopic component in the first embodiment of the present disclosure.
Figure 3:
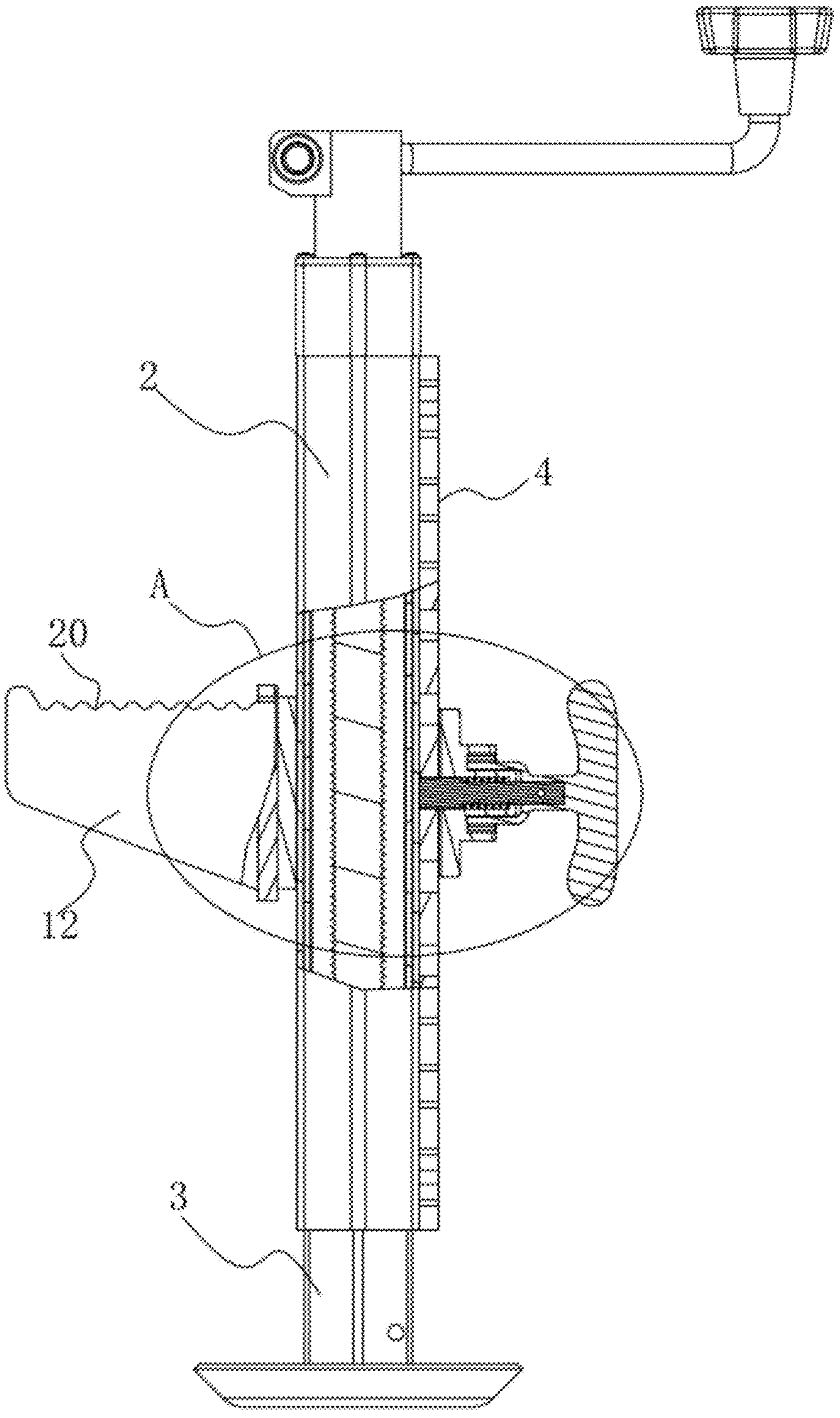
FIG. 3 is a schematic structural view of combination between the telescopic component and a load-bearing component in the first embodiment of the present disclosure.
Figure 4:
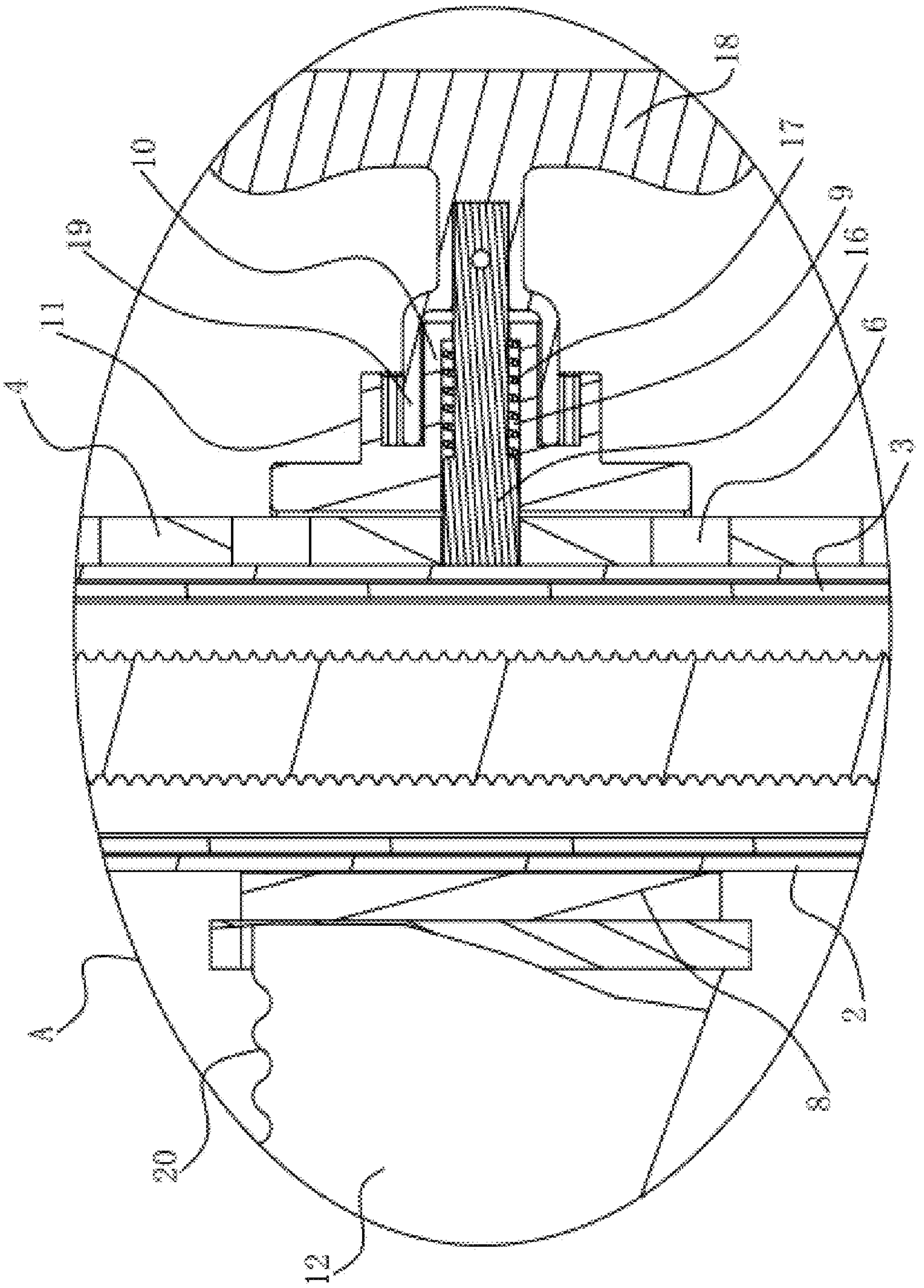
FIG. 4 is an enlarged view of portion A shown in FIG. 3.
Figure 5:
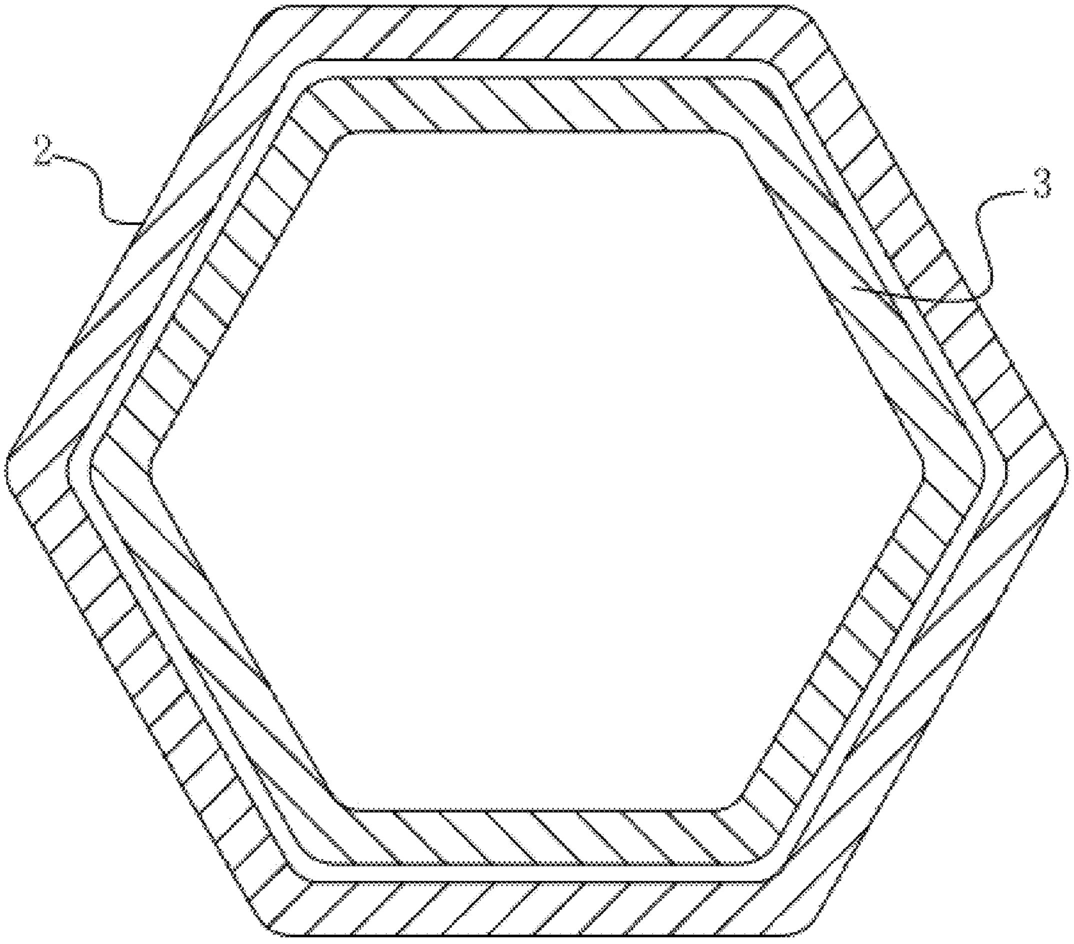
FIG. 5 is a schematic structural view of combination between an outer pipe and an inner pipe of the telescopic component in the first embodiment of the present disclosure.
Figure 6:
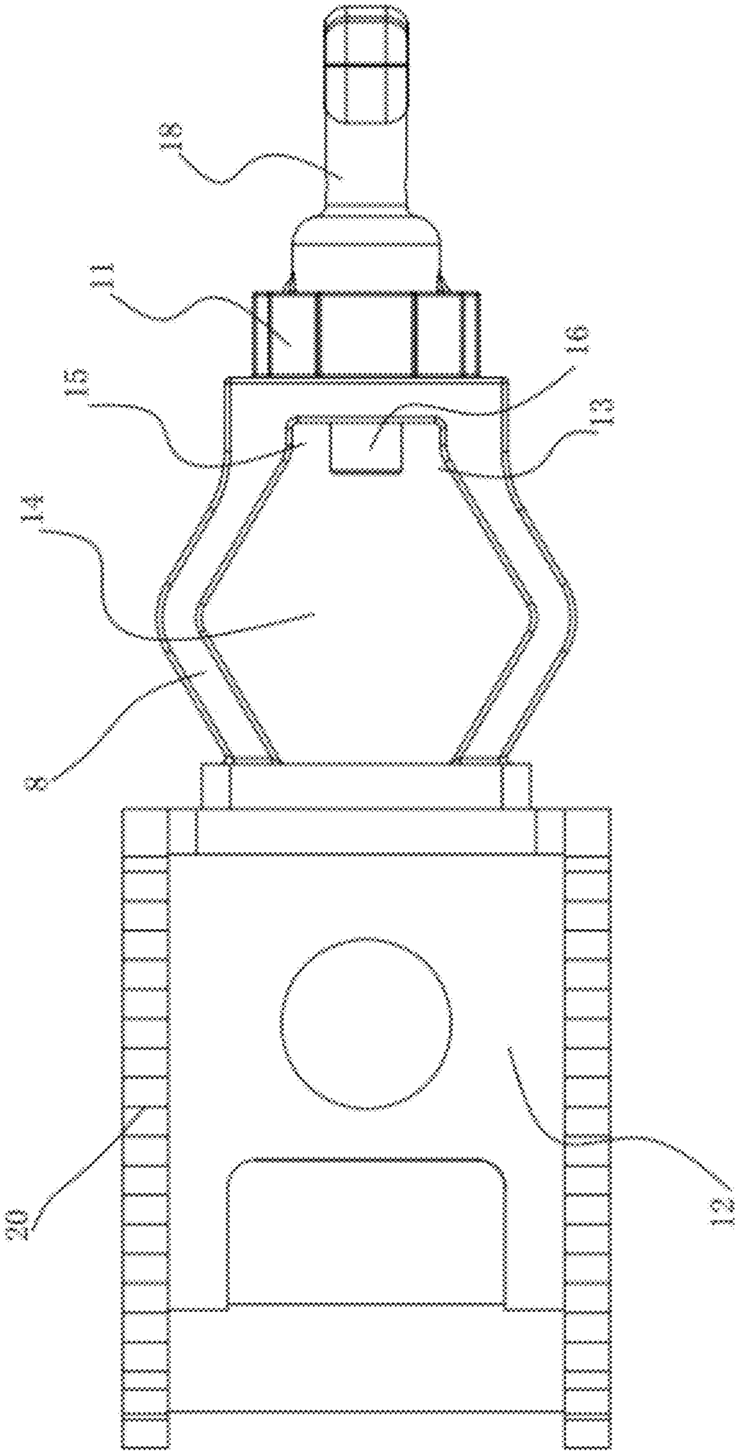
FIG. 6 is a schematic structural view of the load-bearing component in the first embodiment of the present disclosure.

FIG. 1, FIG. 2, FIG. 3, FIG. 4, FIG. 5 and FIG. 6 show a first embodiment of the present disclosure.

The height quickly-adjustable jack includes a telescopic component 1, a load-bearing component 7 and a support component. The telescopic component 1 is provided with a hand crank, an inner pipe 3, an outer pipe 2, a limiting plate 4 and a lead screw mechanism. The inner pipe 3 is located inside the outer pipe 2, the inner pipe 3 is connected with the outer pipe 2 through the lead screw mechanism, and the hand crank is connected with a lead screw of the lead screw mechanism. The hand crank may be rotated to drive the inner pipe 3 to perform a translation motion along the center line of the outer pipe 2. The support component is configured to touch the bottom and may be a universal wheel or a support plate structure. In this embodiment, a support plate is selected as an example. The support component is fixedly mounted at an end of the inner pipe 3. The load-bearing component 7 is movably mounted on the outer pipe 2. In general, by rotating the hand crank, the operating height of the height quickly-adjustable jack can be adjusted, where if the inner pipe 3 extends outward relative to the outer pipe 2, the operating height increases; and if the inner pipe 3 shrinks inward relative to the outer pipe 2, the operating height decreases.

The outer pipe 2 has a hexagonal pipe structure, and the outer contour shape and the inner contour shape of the cross section of the outer pipe 2 are both regular hexagons; an outer surface of the outer pipe 2 is provided with six side surfaces; and the outer contour shape and the inner contour shape of the cross section of the inner pipe 3 are both regular hexagons. The limiting plate 4 has a strip-shaped structure, and the limiting plate 4 is fixedly mounted outside the outer pipe 2 in a welding manner and is only connected with one of the side surfaces. The extension direction of the limiting plate 4 on the outer pipe 2 is parallel to the center line of the outer pipe 2. The limiting plate 4 is provided with limiting holes 6 distributed at equal intervals, and the arrangement direction of the limiting holes 6 is parallel to the center line of the outer pipe 2. The limiting holes 6 are located in the limiting plate 4, and the space of the limiting holes 6 is only distributed in the limiting plate 4, thereby avoiding the distribution of the limiting holes 6 on the outer pipe 2, and preventing the material reducing property damage to the outer pipe 2 to prevent the structural strength of the outer pipe 2 from being affected. Edges of the limiting plate 4 are all provided with arc-shaped gaps 5, and the gaps 5 and the limiting holes 6 are arranged in a staggered manner in a direction parallel to the center line of the outer pipe 2.

The load-bearing component 7 is provided with a pipe sleeve 8, a load-bearing seat 12 and a clamping component. A through-type accommodating hole 13 is formed inside the pipe sleeve 8. The accommodating hole 13 is divided into two parts: a hole I 14 for accommodating the outer pipe 2 and a hole II 15 for accommodating the limiting plate 4. The contour shape of the cross section of the hole I 14 is a regular hexagon, the contour shape of the cross section of the hole II 15 is a rectangle, and the hole I 14 is in direct communication with the hole II 15. During mounting, the pipe sleeve 8 is sleeved over the outer pipe 2, the outer pipe 2 passes through the hole I 14, the limiting plate 4 passes through the hole II 15, and a center line of the hole I 14 coincides with the center line of the outer pipe 2. The contour shape of the cross section of the accommodating hole 13 is the same as the contour shape of the cross section of the outer pipe 2 at the position provided with the limiting plate 4.

The pipe sleeve 8 is provided with a guide column 10 and a baffle ring 11. The guide column 10 is perpendicular to the center line of the hole I 14, the pipe sleeve 8 is provided with a mounting hole 9, the mounting hole 9 is located in the guide column 10, one end of the mounting hole 9 is in direct communication with the hole II 15, and the other end of the mounting hole 9 is in communication with the external space of the pipe sleeve 8; a center line of the mounting hole 9 coincides with a center line of the guide column 10; and the cross section of the mounting hole 9 is convex, and the pipe sleeve 8 forms a step surface at the position of the mounting hole 9. The baffle ring 11 surrounds the guide column 10, the guide column 10 is located in the middle of the baffle ring 11, a center line of the baffle ring 11 coincides with the center line of the guide column 10, and the length of the baffle ring 11 is less than the length of the guide column 10.

The clamping component includes a limiting column 16, a spring 17 and a handle 18. The cross section of the limiting column 16 is convex and includes two segments of cylindrical parts with different radii, and a step surface is formed between the two segments of cylindrical parts. The spring 17 is sleeved over the limiting column 16, the limiting column 16 is mounted in the mounting hole 9 in a sliding manner, that is, the limiting column 16 may slide in the mounting hole 9, one end of the spring 17 is supported by the step surface located on the limiting column 16, and the other end of the spring 17 is supported by the step surface in the pipe sleeve 8, so that the spring 17 is located between the limiting column 16 and the pipe sleeve 8, and the spring 17 is always in a compressed state. One end of the limiting column 16 passes through the mounting hole 9 and is located outside the pipe sleeve 8, and the other end of the limiting column 16 extends into the hole II 15. The end of the limiting column 16 located outside the pipe sleeve 8 is fixedly connected with the handle 18. The handle 18 is provided with a guide sleeve 19, the guide sleeve 19 is distributed around the limiting column 16, and a center line of the guide sleeve 19 coincides with a center line of the limiting column 16. After mounting, one end of the guide column 10 is embedded in the guide sleeve 19, and the guide sleeve 19 is slidably connected with the guide column 10; and the guide sleeve 19 is also located inside the baffle ring 11.

The load-bearing seat 12 is fixedly mounted on the pipe sleeve 8, and the top of the load-bearing seat 12 is provided with a wavy object-bearing surface 20 corresponding to a load-bearing operation. During use, the object-bearing surface 20 directly supports a travel trailer. The load-bearing seat 12 is located on one side of the outer pipe 2, and the handle 18 is located on the other side of the outer pipe 2. During mounting, the limiting column 16 is embedded in the limiting hole 6 to achieve a connection state in which the outer pipe 2 and the limiting plate 4 are embedded in the accommodating hole 13 and the limiting column 16 is embedded in the limiting hole 6. After mounting, the center line of the guide column 10 is perpendicular to the center line of the outer pipe 2, and the center line of the limiting column 16 is also perpendicular to the center line of the outer pipe 2. In this way, the pipe sleeve 8 not only cannot rotate relative to the outer pipe 2 in the circumferential direction around the center line of the outer pipe 2, but also cannot translate relative to the outer pipe 2 in the direction parallel to the center line of the outer pipe 2. Therefore, the load-bearing component 7 and the telescopic component 1 are assembled together. When it is necessary to change the relative position of the load-bearing component 7 on the telescopic component 1, only the handle 18 needs to be pulled to enable the limiting column 16 to be detached from the limiting hole 6, and then, the load-bearing component 7 is adjusted to other positions to ensure that the limiting column 16 is embedded in another limiting hole 6. The positioning effect obtained by the load-bearing component 7 on the limiting plate 4 can greatly change the operating height of the load-bearing component 7, that is, the operating height of the jack, and this adjusting process is a coarse adjustment manner. The hand crank can be rotated to slightly change the operating height, and this adjusting process is a fine adjustment manner. When the operating height of the height quickly-adjustable jack is greatly adjusted, the load-bearing component 7 can be located near the predetermined operating height in the manner of coarse adjustment, and then, the length of the telescopic component 1 is changed in the manner of fine adjustment until the jack is located at the predetermined operating height.

Figure 7:
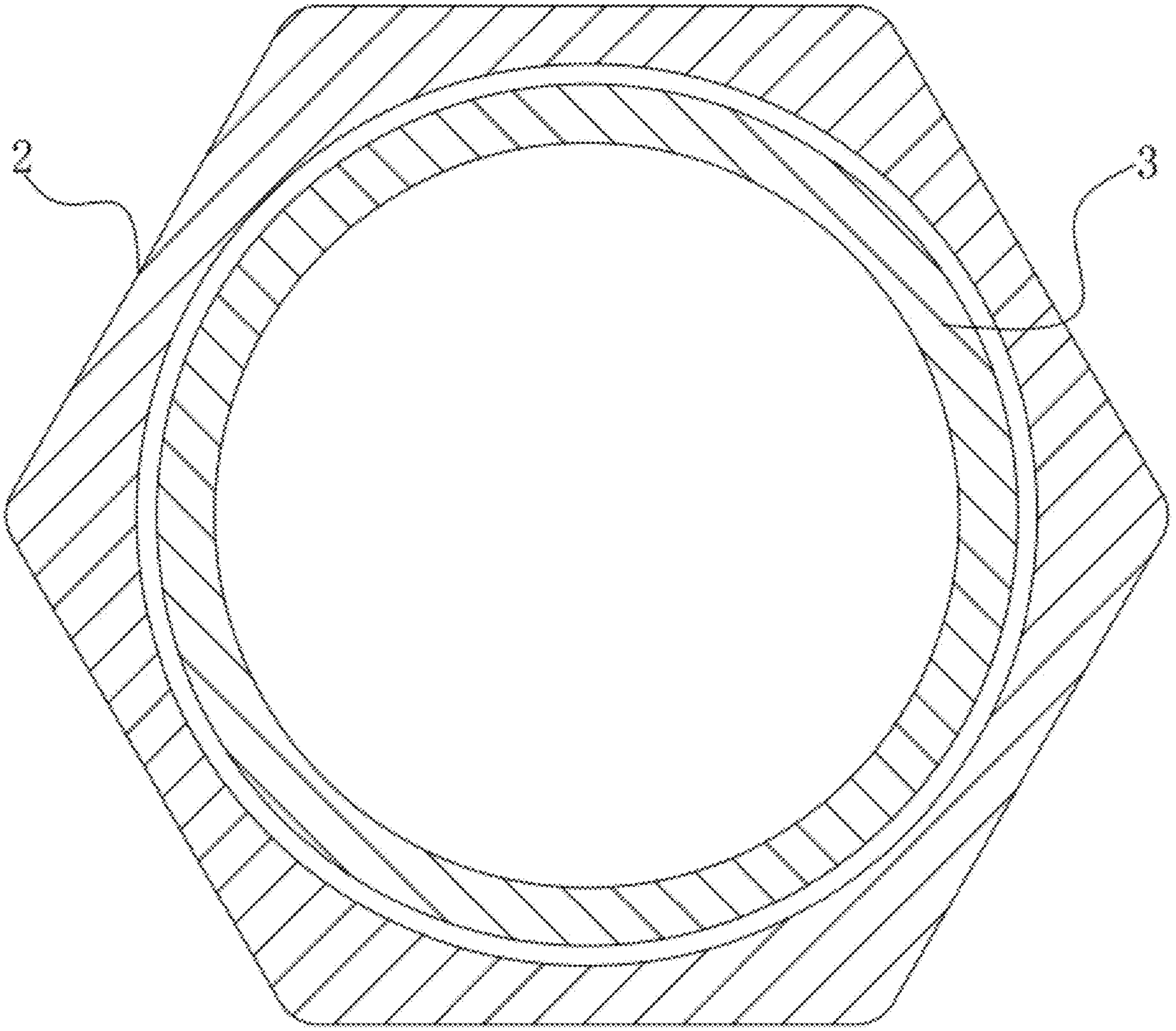
FIG. 7 is a schematic structural view of combination between an outer pipe and an inner pipe of a telescopic component in a second embodiment of the present disclosure.

FIG. 7 shows a second embodiment of the present disclosure, and the difference between the second embodiment and the first embodiment is that the inner contour shape of the cross section of the outer pipe 2 is a circle, and the outer contour shape and the inner contour shape of the cross section of the inner pipe 3 are both circles.

Figure 8:
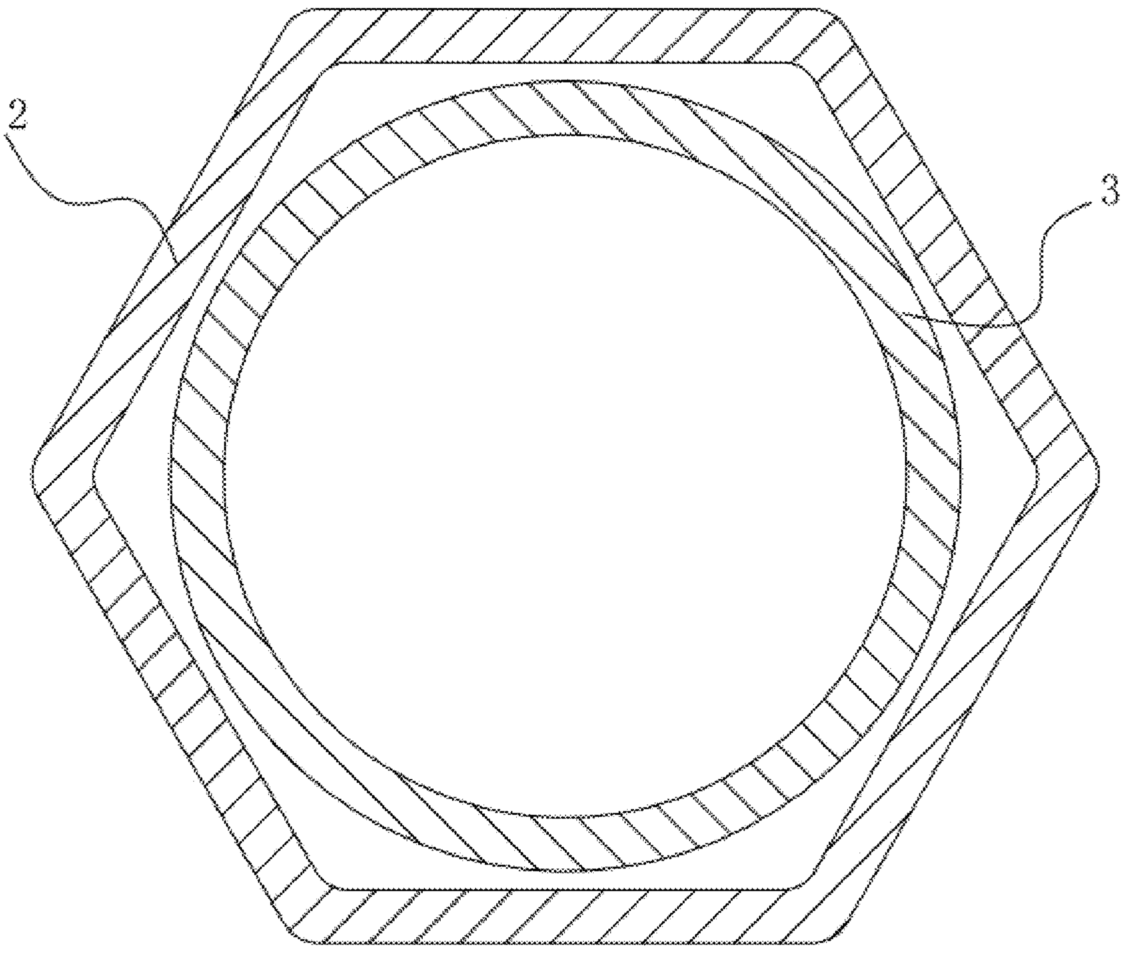
FIG. 8 is a schematic structural view of combination between an outer pipe and an inner pipe of a telescopic component in a third embodiment of the present disclosure.

FIG. 8 shows a third embodiment of the present disclosure, and the difference between the third embodiment and the first embodiment is that the outer contour shape and the inner contour shape of the cross section of the inner pipe 3 are both circles.

Figure 9:
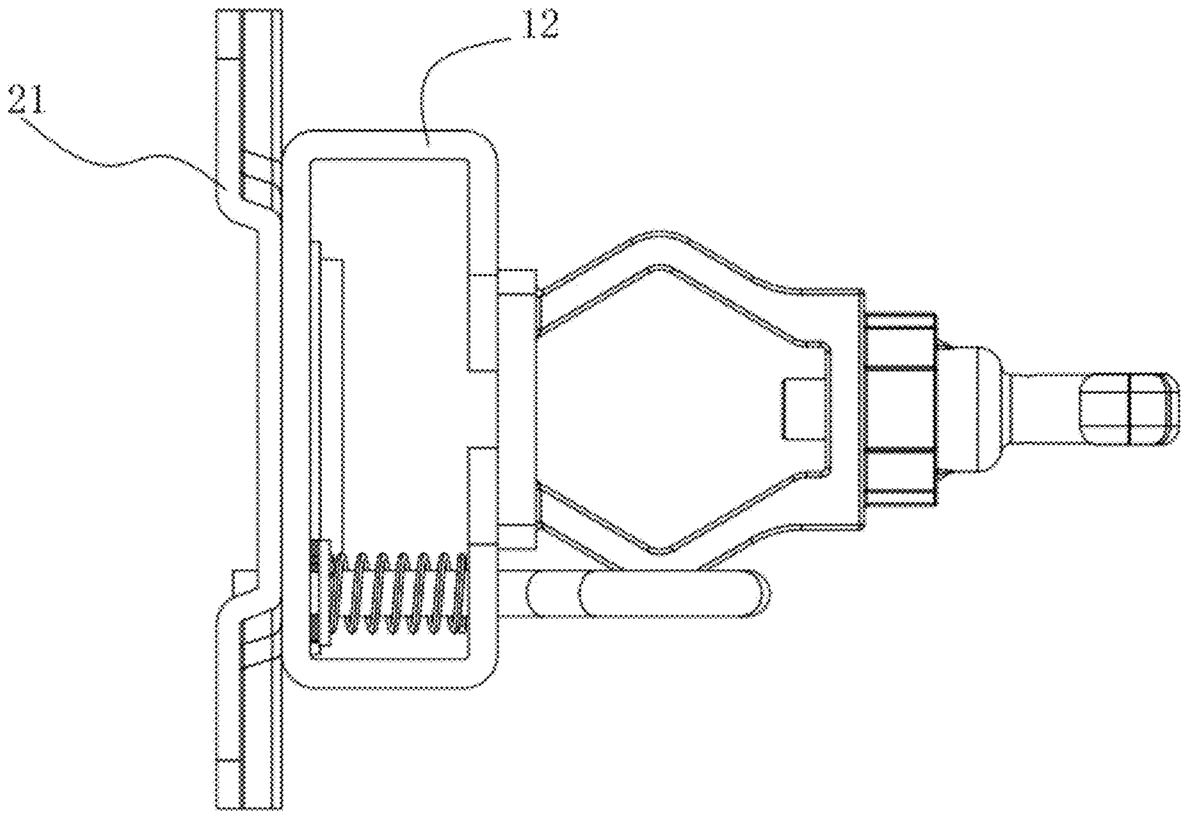
FIG. 9 is a schematic structural view of a load-bearing component in a fourth embodiment of the present disclosure.

FIG. 9 shows a fourth embodiment of the present disclosure, and the difference between the fourth embodiment and the first embodiment is that the load-bearing seat 12 is provided with a turntable 21, and the rotation direction of the turntable 21 is located in a vertical plane. During use, the turntable 21 is fixedly connected with a travel trailer through bolts.

Figure 10:
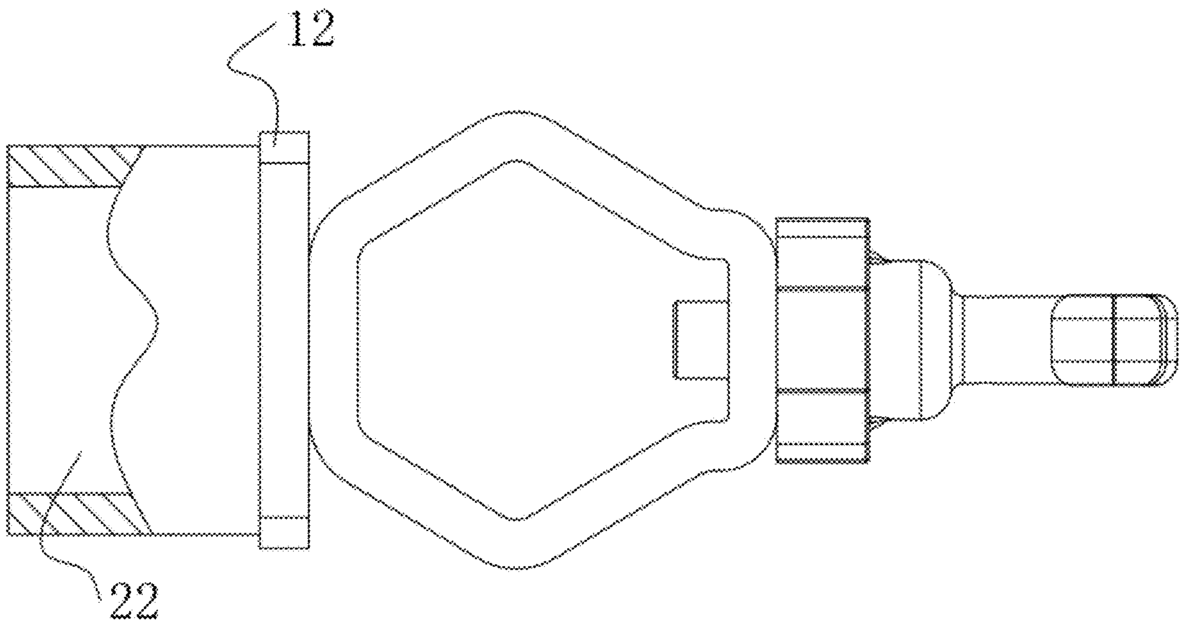
FIG. 10 is a schematic structural view of a load-bearing component in a fifth embodiment of the present disclosure.

FIG. 10 shows a fifth embodiment of the present disclosure, and the difference between the fifth embodiment and the first embodiment is that the load-bearing seat 12 is provided with an assembly hole 22, and a center line of the assembly hole 22 is perpendicular to the center line of the outer pipe 2. During use, the assembly hole 22 is butted with a protruding part on a travel trailer, that is, the protruding part is embedded in the assembly hole 22.

Figure 11:
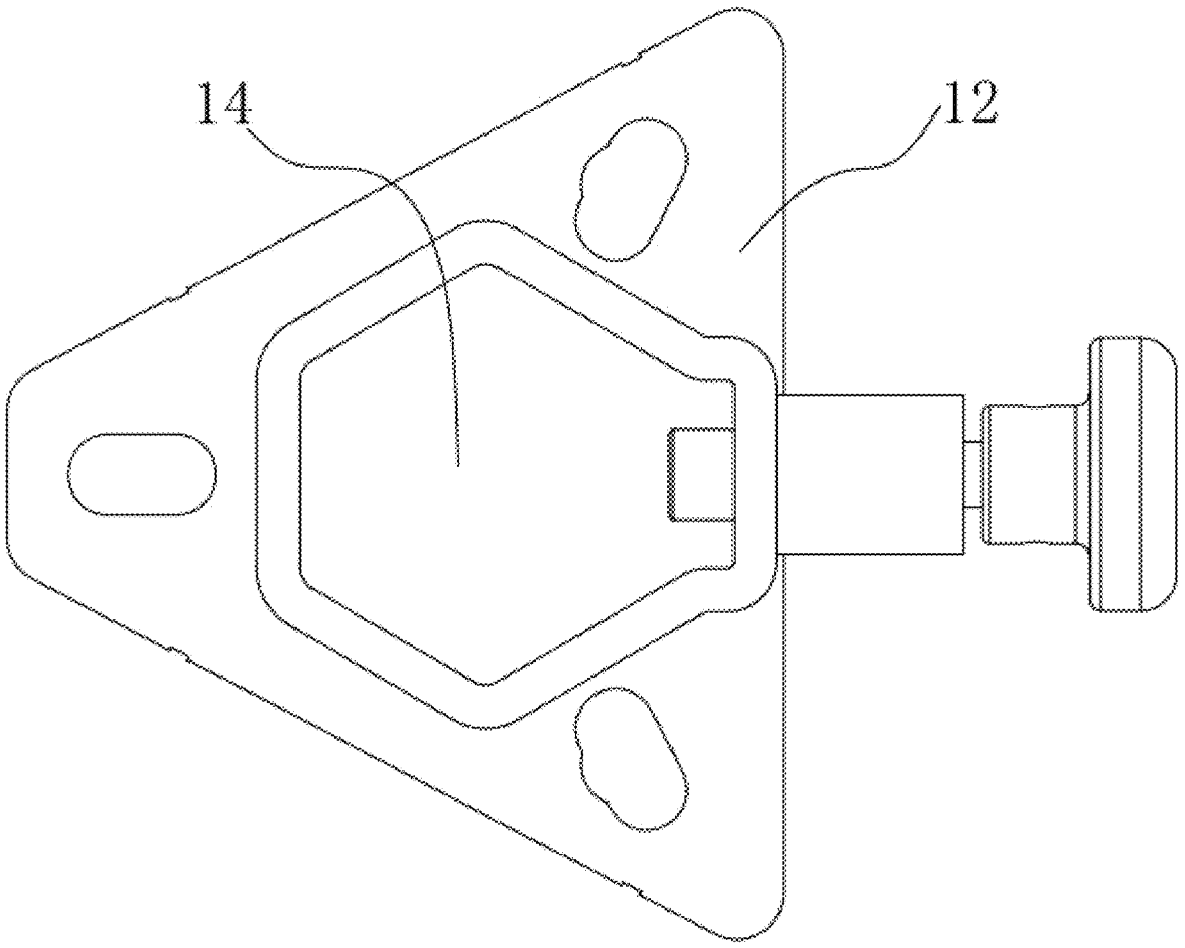
FIG. 11 is a schematic structural view of a load-bearing component in a sixth embodiment of the present disclosure.

FIG. 11 shows a sixth embodiment of the present disclosure, and the difference between the sixth embodiment and the first embodiment is that the contour of the load-bearing seat 12 is a triangle, and a center line of the load-bearing seat 12 coincides with the center line of the hole I 14. During use, the load-bearing seat 12 is fixedly connected with a travel trailer through bolts.

What is claimed is:

1. A height quickly-adjustable jack, comprising a telescopic component (1) and a load-bearing component (7), the telescopic component (1) being provided with an outer pipe (2) and an inner pipe (3), the inner pipe (3) being located inside the outer pipe (2), and the inner pipe (3) being movably connected with the outer pipe (2) along a center line of the outer pipe (2), wherein the outer pipe (2) has a hexagonal pipe structure; an outer surface of the outer pipe (2) is provided with six side surfaces; the telescopic component (1) is also provided with a limiting plate (4); the limiting plate (4) is fixedly mounted outside the outer pipe (2) and is only connected with one of the side surfaces; an extension direction of the limiting plate (4) on the outer pipe (2) is parallel to the center line of the outer pipe (2); the limiting plate (4) is provided with limiting holes (6); an arrangement direction of the limiting holes (6) is parallel to the center line of the outer pipe (2); the load-bearing component (7) is movably mounted on the outer pipe (2); the load-bearing component (7) is provided with a pipe sleeve (8), a load-bearing seat (12) and a clamping component; a through-type accommodating hole (13) is formed inside the pipe sleeve (8); the accommodating hole (13) comprises a hole I (14) for accommodating the outer pipe (2) and a hole II (15) for accommodating the limiting plate (4); the hole I (14) is in communication with the hole II (15); a center line of the hole I (14) coincides with the center line of the outer pipe (2); an outer contour shape of the cross section of the outer pipe (2) and a contour shape of the cross section of the hole I (14) are both regular hexagons; an outer contour shape of the cross section of the limiting plate (4) and a contour shape of the cross section of the hole II (15) are both rectangles; a contour shape of the cross section of the accommodating hole (13) is the same as a contour shape of the cross section of the outer pipe (2) at a position provided with the limiting plate (4); the clamping component comprises a limiting column (16), a spring (17) and a handle (18); the cross section of the limiting column (16) is convex; the spring (17) is sleeved over the limiting column (16); the pipe sleeve (8) is provided with a mounting hole (9); the cross section of the mounting hole (9) is convex; the limiting column (16) is mounted in the mounting hole (9) in a sliding manner; the spring (17) is located between the limiting column (16) and the pipe sleeve (8); one end of the limiting column (16) is located outside the pipe sleeve (8) and is fixedly connected with the handle (18), and the other end of the limiting column (16) extends into the hole II (15); the load-bearing seat (12) is fixedly mounted on the pipe sleeve (8); and the pipe sleeve (8) is embedded in the accommodating hole (13) through the outer pipe (2) and the limiting plate (4), and the limiting column (16) is embedded in the limiting hole (6) and movably mounted on the telescopic component (1).

2. The height quickly-adjustable jack according to claim 1, wherein an inner contour shape of the cross section of the outer pipe (2) is a regular hexagon, and an outer contour shape and an inner contour shape of the cross section of the inner pipe (3) are both regular hexagons.

3. The height quickly-adjustable jack according to claim 1, wherein an inner contour shape of the cross section of the outer pipe (2) is a circle, and an outer contour shape and an inner contour shape of the cross section of the inner pipe (3) are both circles.

4. The height quickly-adjustable jack according to claim 1, wherein edges of the limiting plate (4) are provided with arc-shaped gaps (5), and the gaps (5) and the limiting holes (6) are arranged in a staggered manner in a direction parallel to the center line of the outer pipe (2).

5. The height quickly-adjustable jack according to claim 1, wherein the pipe sleeve (8) is provided with a guide column (10), the mounting hole (9) is located in the guide column (10), a center line of the mounting hole (9) coincides with a center line of the guide column (10), the handle (18) is provided with a guide sleeve (19), the guide column (10) extends into the guide sleeve (19), and the guide sleeve (19) is slidably connected with the guide column (10).

6. The height quickly-adjustable jack according to claim 5, wherein the pipe sleeve (8) is provided with a baffle ring (11), and the guide sleeve (19) is located inside the baffle ring (11).

7. The height quickly-adjustable jack according to claim 1, wherein the top of the load-bearing seat (12) is provided with a wavy object-bearing surface (20) corresponding to a load-bearing operation.

8. The height quickly-adjustable jack according to claim 1, wherein the load-bearing seat (12) is provided with a turntable (21), and a rotation direction of the turntable (21) is located in a vertical plane.

9. The height quickly-adjustable jack according to claim 1, wherein the load-bearing seat (12) is provided with an assembly hole (22), and a center line of the assembly hole (22) is perpendicular to the center line of the outer pipe (2).

10. The height quickly-adjustable jack according to claim 1, wherein a contour of the load-bearing seat (12) is a triangle, and a center line of the load-bearing seat (12) coincides with the center line of the hole I (14).

* * * * *